United States Patent
Atkin

(10) Patent No.: US 9,291,402 B2
(45) Date of Patent: Mar. 22, 2016

(54) HEAT EXCHANGER

(71) Applicant: Redring Xpelair Group Ltd., Cambridgeshire (GB)

(72) Inventor: Howard Atkin, North Yorkshire (GB)

(73) Assignee: REDRING XPELAIR GROUP LTD., Cambridgeshire (GB)

( * ) Notice: Subject to any disclaimer, the term of this patent is extended or adjusted under 35 U.S.C. 154(b) by 334 days.

(21) Appl. No.: 13/892,277

(22) Filed: May 11, 2013

(65) Prior Publication Data

US 2013/0306282 A1 Nov. 21, 2013

(30) Foreign Application Priority Data

May 19, 2012 (GB) .................................. 1208984.3

(51) Int. Cl.
*F28D 11/00* (2006.01)
*F28D 11/02* (2006.01)
(Continued)

(52) U.S. Cl.
CPC ................ *F28F 1/00* (2013.01); *F24F 12/006* (2013.01); *F24F 13/30* (2013.01); *F28D 19/042* (2013.01); *F28D 19/047* (2013.01); *F28D 21/0008* (2013.01); *F24F 2203/1004* (2013.01); *F24F 2203/104* (2013.01); *F24F 2203/1008* (2013.01); *F24F 2203/1048* (2013.01); *F24F 2203/1068* (2013.01); *F24F 2203/1096* (2013.01); *F28D 19/048* (2013.01); *Y02B 30/563* (2013.01)

(58) Field of Classification Search
CPC ... F28D 1/05333; F28D 11/02; F28D 11/025; F28D 11/04; F28D 11/08; F24F 2006/065; F24F 2003/1464; F24F 3/1423
See application file for complete search history.

(56) References Cited

U.S. PATENT DOCUMENTS 4,182,400 A * 1/1980 de Nevers ........................ 165/86
4,497,361 A * 2/1985 Hajicek ............................ 96/125
(Continued)

FOREIGN PATENT DOCUMENTS

CA 2 687 842 A1 12/2008
CA 2689712 A1 8/2010
(Continued)

OTHER PUBLICATIONS

Partial English translation of JP Publication No. 2000-220977, published Aug. 8, 2000, in the name of Takigawa, previously cited on May 29, 2013 (1 sheet).
(Continued)

*Primary Examiner* — Frantz Jules
*Assistant Examiner* — Erik Mendoza-Wilkenfel
(74) *Attorney, Agent, or Firm* — Lewis Roca Rothgerber Christie LLP

(57) ABSTRACT

This invention provides a heat exchanger (2) which has an elongate heat exchange element (4). The heat exchange element (4) has a substantially cylindrical structure with a first end and a second end and the length of the element (4) is greater than the diameter. A plurality of elongate flow paths extend between the first end and the second end. A first inlet (8) and a second outlet (14) are disposed in the first end and a first outlet (10) and a second inlet (12) are disposed in the second end. The first inlet (8) and first outlet (10) define a first flow path and the second inlet (12) and second outlet (14) define a second flow path. The heat exchanger is provided with a motor (16, 18) for rotating the cylindrical structure and the rotation of the cylindrical structure (4) moves the elongate flow paths from the first flow path to the second flow path.

18 Claims, 4 Drawing Sheets

(51) Int. Cl.

| | | |
|---|---|---|
| *F28D 11/08* | (2006.01) | |
| *F24F 3/14* | (2006.01) | |
| *F24F 6/06* | (2006.01) | |
| *F28F 1/00* | (2006.01) | |
| *F24F 13/30* | (2006.01) | |
| *F28D 19/04* | (2006.01) | |
| *F28D 21/00* | (2006.01) | |
| *F24F 12/00* | (2006.01) | |

(56) References Cited

U.S. PATENT DOCUMENTS

| | | | |
|---|---|---|---|
| 7,841,390 B1 | 11/2010 | Kaser et al. | |
| 2006/0254756 A1* | 11/2006 | Kaser et al. | 165/133 |
| 2007/0056307 A1* | 3/2007 | Caggiano | 62/271 |
| 2009/0139254 A1* | 6/2009 | Landry | 62/271 |
| 2010/0132379 A1* | 6/2010 | Wu et al. | 62/3.2 |
| 2011/0083458 A1* | 4/2011 | Takakura et al. | 62/176.1 |
| 2012/0085023 A1* | 4/2012 | Teal et al. | 44/605 |

FOREIGN PATENT DOCUMENTS

| | | |
|---|---|---|
| DE | 29909010 U1 | 8/1999 |
| DE | 10 2007 027 840 A1 | 12/2008 |
| GB | 1405349 A | 9/1975 |
| JP | 2000-220977 | 8/2000 |
| JP | 2000220977 A * | 8/2000 |
| WO | WO2006/006827 A1 | 1/2006 |
| WO | WO 2012/044230 A2 | 4/2012 |

OTHER PUBLICATIONS

Extended European Search Report dated Feb. 4, 2015, issued in Application No. 13163395.0, 6 pages.

Search Report dated Sep. 10, 2012, issued for United Kingdom Patent Application No. 1208984.3, 5 pages.

* cited by examiner

HEAT EXCHANGER

CROSS REFERENCE TO RELATED APPLICATIONS

This patent claims priority from UK patent application 1208984.3 filed on the 19$^{th}$ of May 2012.

BACKGROUND TO THE INVENTION

The present invention relates to heat exchangers, in particular the present invention relates to heat exchangers for exchanging heat between an extract air flow and an inlet air flow of a building or the like.

Heat exchangers of the heat wheel are known in the art and it is known to use these types of device, which have a rotating thermal mass with an inlet air flow and an outlet air flow passing through holes or passages in the thermal mass. As it rotates the holes or passages move from the inlet flow area to the outlet flow area and the thermal mass stores energy form the extract air and imparts it to the inlet air. These devices are known to have large disk shaped wheels.

There are a number of problems with these devices that include: lower than ideal efficiency, cross transfer of exhaust air into the inlet air, and size, which results in higher than desirable energy consumption.

Known heat wheel heat exchangers are known for use in total building systems, for example integrated with large air handlers, but are not suited to individual small extract usage, as may be required in a domestic property, for example to meet bathroom extraction requirements.

BRIEF SUMMARY OF THE INVENTION

It is the purpose of the present invention to provide a small heat exchanger that is highly efficient and only consumes a small amount of energy and that at least in part mitigates some of the problems associated with traditional heat wheel heat exchangers.

According to a first aspect of the invention there is provided: a heat exchanger comprising: an elongate heat exchange element comprising: a substantially cylindrical structure having a first end and a second end and wherein the length is greater than the diameter; and a plurality of elongate flow paths extending between the first end and the second end; and a first inlet and a second outlet disposed in the first end and a first outlet and a second inlet disposed in the second end, the first inlet and first outlet defining a first flow path and the second inlet and second outlet defining a second flow path; and means for rotating the cylindrical structure; wherein rotation of the cylindrical structure moves the elongate flow paths from the first flow path to the second flow path.

Preferably the length is at least twice the diameter. The flow paths are preferably hexagonal.

The plurality of elongate flow paths may comprise one of: a plastics extrusion containing a plurality of parallel flow paths; and a plurality of elongate straw like elements arranged adjacent one another.

In a preferred arrangement the second flow path comprises a cooled air flow path and the first flow path comprises a heated air flow path and wherein the second flow path comprises a grater number of the plurality of elongate flow paths than the first flow path.

Preferably the heat exchanger further comprises a seal element that seals against the end faces of the plurality of elongate flow paths, the seal element defining the first flow path one side thereof and the second flow path on the other side thereof. The seal element may preferably comprise two seals extending substantially from the centre of rotation of the cylindrical element to the edge of the cylindrical element.

In one arrangement the seal comprises a plurality of resilient rollers arranged to rotate against the end faces of the plurality of flow paths as they rotate. Other seal arrangements may also be used, for example the seal may comprise a foam plastic strip covered with a low friction fibre reinforced facing layer. The seal may beat least twice as wide as the individual elongate flow paths.

The heat exchanger may further comprise an inlet fan in fluid communication with the first flow path and an outlet fan in fluid communication with the second flow path, said first and second fans for driving gas through the first flow path in a first direction and a through the second flow path in the opposite direction to effect that transfer between the fluid flowing in the first and second flow paths. The fans may be located at or adjacent the second end of the cylindrical structure.

Preferably the seal element is surrounded by a seal housing and wherein the seal housing at the second end of the cylindrical structure further comprises a seal bypass within the housing so that, immediately adjacent the seal, a flow path is provided from outlets of the elongate flow paths of the first flow path to the inlets of the elongate flow paths of the second flow path. The heat exchanger may further comprise an inlet fan in fluid communication with the first flow path and an outlet fan in fluid communication with the second flow path, said first and second fans for driving gas through the first flow path in a first direction and a through the second flow path in the opposite direction to effect that transfer between the fluid flowing in the first and second flow paths and wherein the fans are located at or adjacent the first end of the cylindrical structure In one arrangement the cylindrical structure may be mounted within a bearing at either end and the means for rotating the cylindrical structure comprises a drive means configured to apply a force to the exterior of the cylinder so as to rotate it within the bearings.

According to a second aspect of the invention there is provided a method of heat exchange between extract air and inlet air, the method comprising: providing a heat exchanger having an elongate heat exchange element comprising: a substantially cylindrical structure having a first end and a second end and wherein the length is greater than the diameter; and a plurality of elongate flow paths having a thermal mass and extending between the first end and the second end; and a first inlet and a second outlet disposed in the first end and a first outlet and a second inlet disposed in the second end, the first inlet and first outlet defining a first flow path and the second inlet and second outlet defining a second flow path; and means for rotating the cylindrical structure; driving an extract flow of air through the second flow path thereby imparting energy into the thermal mass of the elongate flow paths of the second flow path; rotating the cylindrical structure to move the elongate flow paths from the first flow path to the second flow path; and driving an inlet flow of air through the first flow path to extract energy from the thermal mass of the elongate flow paths of the first flow path.

Preferably providing the plurality of elongate flow paths comprises providing a plurality of hexagonal straw like elements and arranging these in a substantially tessellated arrangement within an outer casing to form the cylindrical structure.

The method preferably comprises driving the inlet flow and the outlet flow in opposite directions.

The method may further comprise: providing a seal element that seals against the end faces of the plurality of elongate flow paths, the seal element defining the first flow path one side thereof and the second flow path on the other side thereof; providing seal bypass from outlets of the elongate flow paths of the first flow path immediately adjacent the seal to the inlets of the elongate flow paths of the second flow path immediately adjacent the seal such that inlet air exiting the flow paths adjacent the seal are directed into the inlets of the elongate flow paths of the second flow path so as to purge them of outlet air.

Preferably the method further comprises controlling the speed of rotation of the cylindrical element so as to control the heat transfer from the outlet air to the inlet air. The higher the speed of rotation the higher the efficiency.

BRIEF SUMMARY OF THE SEVERAL VIEWS OF THE DRAWINGS

The invention will now be described, by way of example only, with reference to the accompanying drawings in which:

Referring to FIG. 1 a heat exchanger 2 is shown. The heat exchanger 2 comprises an elongate cylindrical element 4 that has an inlet flow path and an outlet flow path.

DETAILED DESCRIPTION OF THE INVENTION

Figure 1:
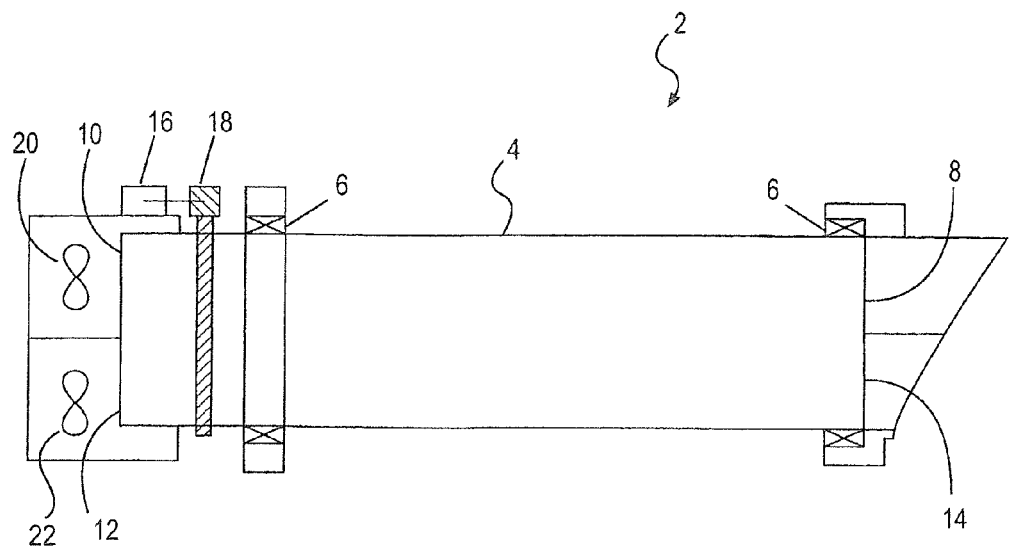
FIG. 1 is a side view of the heat exchanger of the invention.

The elongate cylindrical element 4 is mounted in a bearing 6 at either end so that it may rotate.

The elongate element 4 comprises a plurality of flow passages therethrough through which the incoming, and the outgoing, gas can pass. An inlet 8 and an outlet 10 form the inlet and the outlet of an inlet flow passage through the elongate element 4 and an inlet 12 and outlet 14 form the inlet and outlet of an outlet flow passage through the elongate element 4. In use air is extracted, from for example a building, via the outlet passageway and clean fresh air is drawn into the building through the inlet passageway. The elongate heat exchange element 4 is rotated during use so that the plurality of flow passages therethrough move from the outlet flow path to the inlet flow path as it rotates. As the extracted air, which is at the building interior temperature, passes through the outlet flow path and heat is transferred into the structure of the walls of the flow passages through which it is flowing. As the heat exchange element 4 rotates the flow passages, carrying the heat which their walls have absorbed from the extracted air, become the inlet flow passages and incoming air absorbs the energy from the passage walls. In this way, heat transfer is affected between the extracted air and the incoming air.

A drive means 16 is provided to rotate the heat exchange element. As depicted this drive means 16 may conveniently be a small motor that drives the rotation of the heat exchanger 4 by means of a worm gear 18. Fans 20, 22 may be provided as part of the heat exchanger 2 to drive the incoming and extracted air therethrough.

Figure 2:
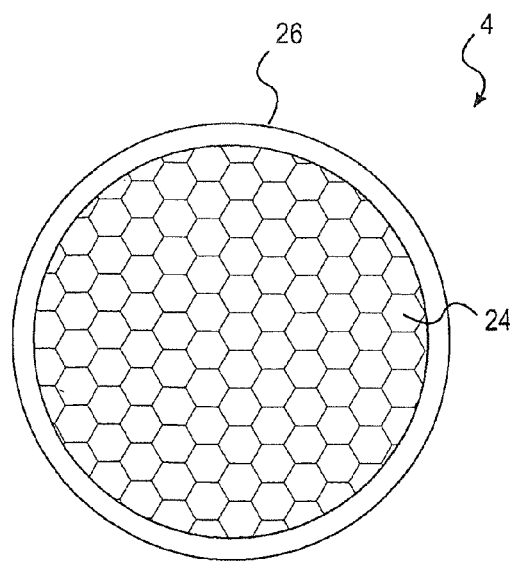
FIG. 2 is an end view of the heat exchanger of the invention.

Referring now to FIG. 2 an end view of the cylindrical element 4 is shown. As can be seen the cylindrical element 4 houses a plurality of flow passages 24 that extend internally along the length of the element 4.

These flow passages may be of any shape but a preferred shape is hexagonal, or any alternative polygonal shape that tessellates in a regular pattern. Hexagonal is preferred as it gives a good ratio of wall area to flow passage.

The flow passages 24 within the element 4 can be manufactured in a number of ways. They could, for example, be integrally fabricated with the element 4 as a single extrusion, or could, for example, be fabricated as a plurality of extrusions that are retained within an outer casing 26 of the element 4. The extrusions could be a number, for example 3 or 4, extrusions each containing a plurality of flow passages therein or alternatively and preferably, each flow path 24 comprises a polygonal, for example hexagonal, straw-like element having thin side walls. These polygonal elements can then be inserted into the outer casing 26 to tessellate in a regular pattern with substantially no space between them.

Figure 3:
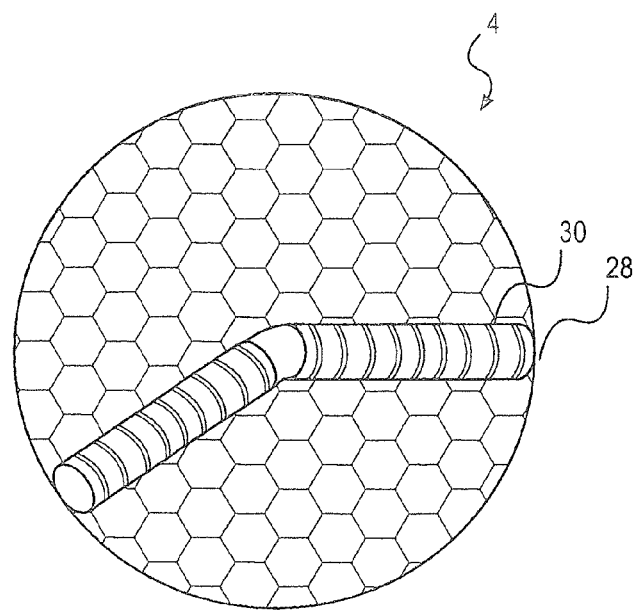
FIG. 3 is a detail of a seal for use with the invention.

Referring now to FIG. 3 an end view of the element 4 is shown. As can be seen the end face of the element 4 is divided into two sections by a seal 28. The seal has two seal portions each of which extend from substantially the centre of the element 4 to its circumference. As can be seen the two seal sections are arranged relative one another at an angle less than 180° so that a larger flow area is presented on one side of the seals than on the other side of the seals. As, in use, the heat exchange element 4 rotates it will be understood that flow passages rotating through the larger section will be exposed to the gas flow and therethrough for a longer period of time than when they flow through the smaller section on the other side of the seals 28. By arranging the seals 28 in this manner and flowing the extracted air through the larger area more heat can be imparted into the side walls of the flow passageways by the outgoing air.

As shown the seal 28 comprises a plurality of rolling seal elements 30 arranged on an axis so that as the element 4 rotates the seal elements are not in contact with the end faces of the flow passageways and form a seal between the inlet on one side of the seals and the outlet on the other side of the seals. By using rolling seal elements friction is reduced and therefore wear, thereby maximising the life of the seals. Furthermore, by using individual rolling seal elements 30, the seals elements are only made of a plurality of rollers which enables the parts of the seal the outer circumference of the element to rotate at a higher speed than those towards the centre of the element 4 thereby minimising any drag effects of the seals created by the difference in speed of rotation of the centre of the element 4 compared to the circumference of the element 4. This also improves the life of the seals.

Figure 4:
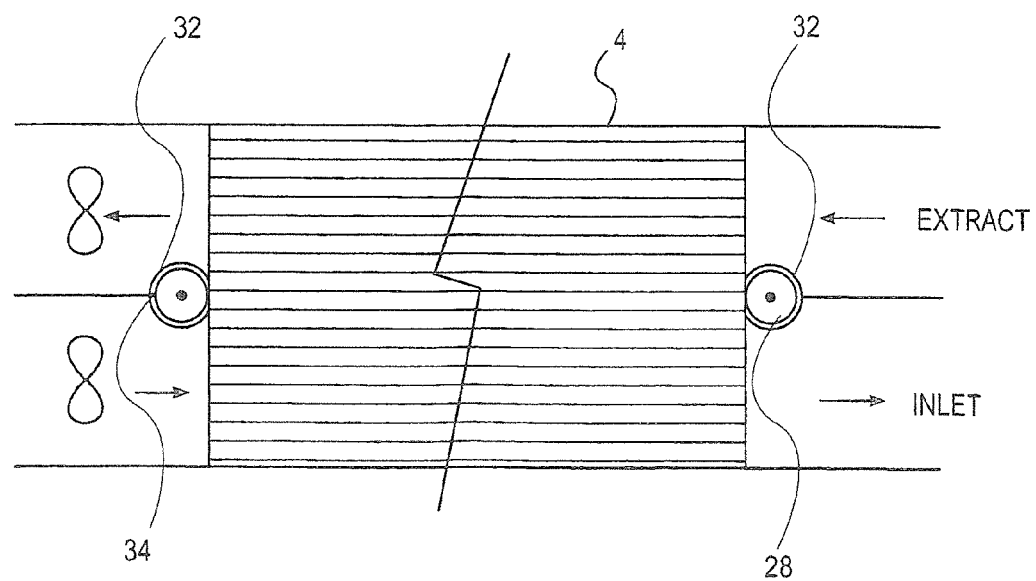
FIG. 4 is a side section through the seals at either end of the heat exchanger.

Referring now to FIG. 4, a cross-section 3 heat exchanger of the invention is shown. As can be seen the seals 28 at either end of the heat exchanger that separate between the inlets air path and the outlet air path are in rolling contact with the end surfaces of the cylindrical element 4. Each seal 28 is enclosed by a seal housing 32. A further sealing element 34 may be provided between the seal 32 and the seal housing 34 so as to prevent air within the seal housing from flowing behind the seals from one passage to the other.

Figure 5:
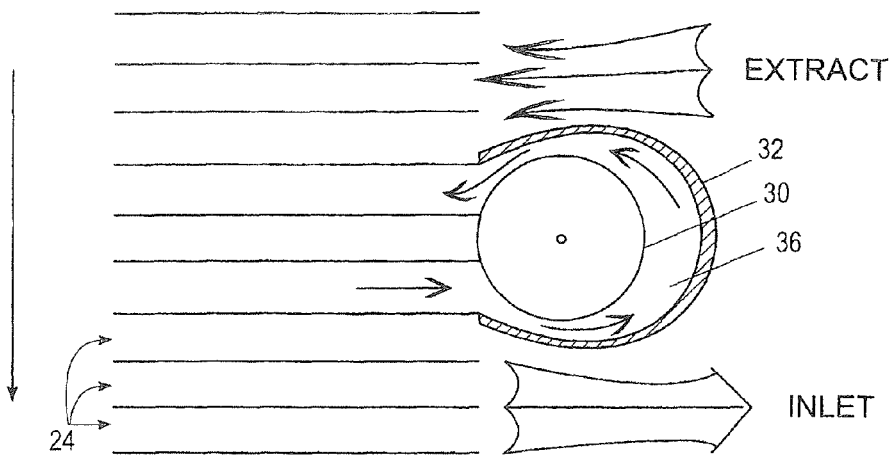
FIG. 5 shows a detail view of one embodiment of the seal used with the invention.

Preferably, at the interior end of the heat exchanger, i.e. that having the inlet for the extracted air and the outlet for the inlet air, i.e. the end which, when installed would open into the interior space of the building, the second sealing element 34 is omitted to provide a bypass flow passage around the seal which is shown in more detail in FIG. 5.

In some instances it may be important or beneficial to prevent any cross flow of incoming and outgoing air within the heat exchangers. As in the present invention the length of the element 4, and therefore the flow passages 24, is longer than the diameter of the heat exchange element 4, and preferably at least twice the length, at the time that these passageways 24 pass from the outlet flow path to the inlet flow path, there will be a residual volume of the extracted air seal within these passageways. As these passageways pass the seal and the flow direction reverses the residual volume of air within the flow passages will be forced back in the opposite direction by the incoming air flow and therefore re-enter the building.

By omitting the sealing element a seal bypass passage 36 is provided immediately adjacent the seal elements 30 such that a flow of the inlet air exiting the flow passages 24 immediately adjacent the seal elements 30 passes inside the seal housing 32, behind the seal element 30, and enters the inlet end of the flow passages immediately adjacent to and moving towards the seal element 30. In this way, by providing a small back flow of clean air through the extract flow passageways immediately before they pass the seal to become the inlet flow passageways the extract air therewithin can be purged therefrom so as to avoid the problems associated with reintroducing the extract air flow into the building via the inlet flow passageways 24. Preferably with this design the inlet and extract fans 20, 22, will need provided adjacent the end of the heat exchange element 4 having the fresh air inlet and the extract air outlet so that clean air is actively driven through the seal bypass passage 36.

Figure 6:
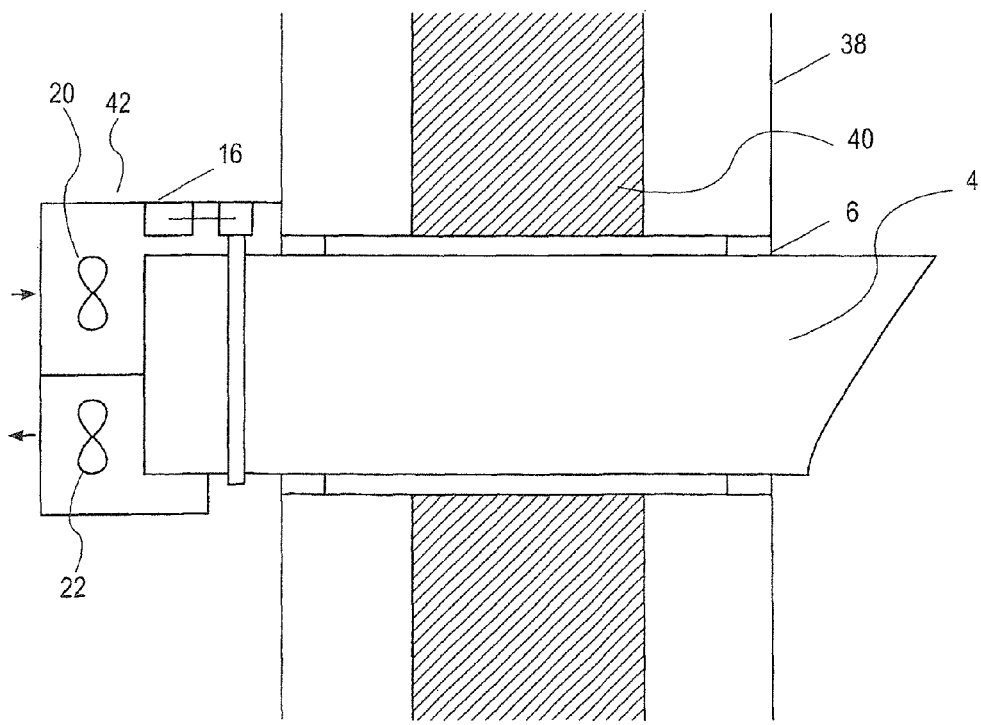
FIG. 6 shows a side view of the invention installed in a wall.

Referring now to FIG. 6, the heat exchanger in accordance with the invention is shown installed into a cavity wall 38. A hole can be drilled through the cavity wall 38 and insulation layer 40 that is larger than the diameter of the cylindrical heat exchange element 4. The hole can be drilled by known methods for example using a standard 110 mm core drill. The hole may be parallel or, alternatively, may be drilled at a slightly inclined angle such that the hole in the outer wall is slightly lower than the hole in the inner wall. In this manner, any liquid which condensates in the neat exchange element will naturally flow towards and then outlet of the heat exchanger exterior to the building.

Bushes 6 are mounted in bush housings which fit snugly within the hole drilled through the wall. A fan unit 42 is provided on the interior of the building and provides an extract fan 20 and an inlet fan 22 to drive the air flow in both directions to the heat exchanger to affect heat exchange. A drive 16 is integrally provided within the fan unit 42 and interfaces with the exterior of the heat exchanger 4 to rotate it.

Figure 7:
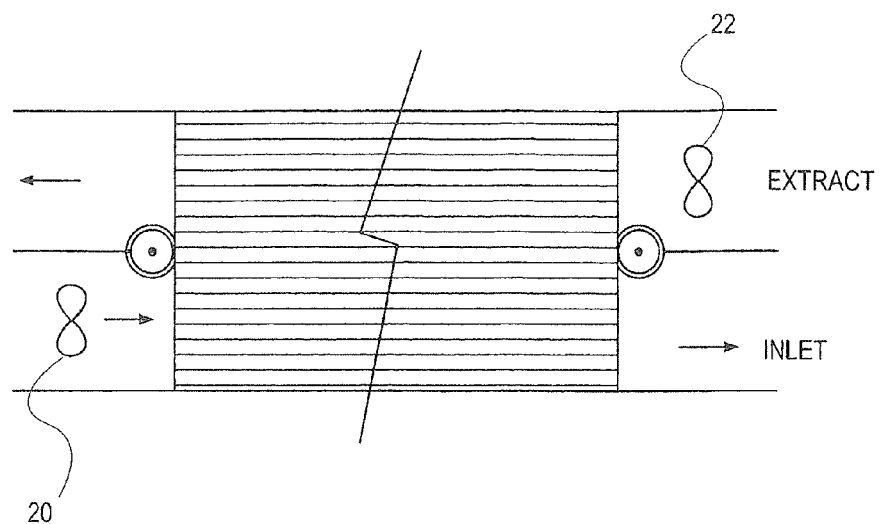
FIG. 7 shows a side view of an alternative arrangement of the invention.

Referring to FIG. 7 an embodiment is shown having the inlet fan at one end and an outlet fan at the other end. Such an embodiment may be beneficial wherein the heat exchanger is placed inline with ducting attached to either end.

Figure 8:
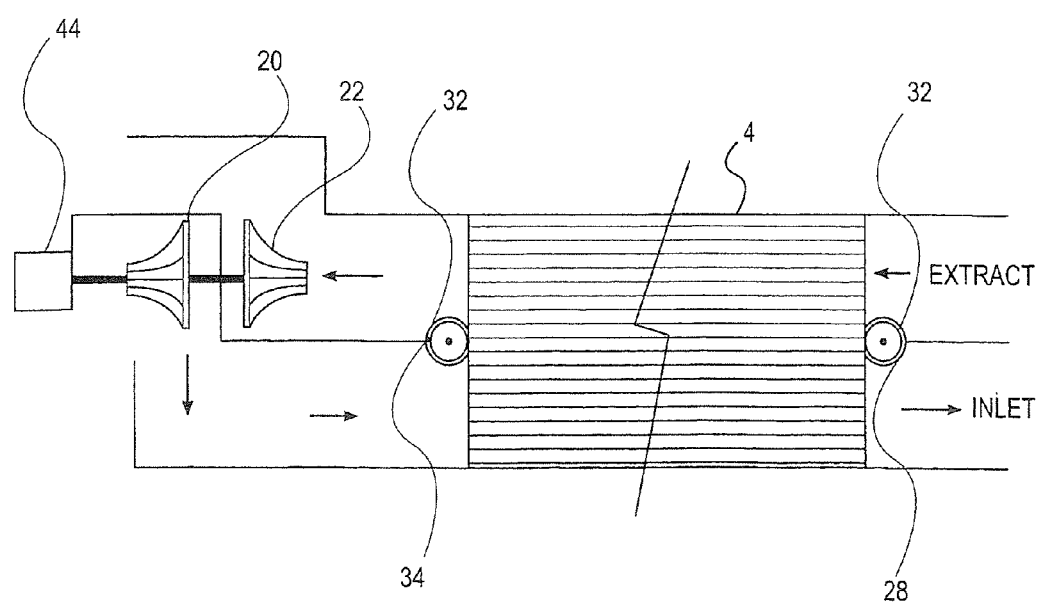
FIG. 8 shows a side view of a yet further alternative arrangement of the invention.

Referring to FIG. 8 and embodiment similar to that shown in FIG. 4 is shown except in so far as in this embodiment both the inlet 20 and extract 22 fans are run off a single motor 40. The fans may be conventional axial fans of may, in this embodiment be centrifugal or mixed flow fans. The casing may be moulded to provide the necessary flow paths for the inlet and extract air flows.

Although the embodiments are described in relation to specific seal types it will be understood that any appropriate sealing means may be used.

The foregoing is described as an example of the invention only and is not to be considered as limiting on the scope of protection which is defined by the claims.

The invention claimed is:

1. A heat exchanger comprising:
an elongate heat exchange element comprising: a substantially cylindrical structure having a first end and a second end and wherein the length is greater than the diameter; and a plurality of elongate flow paths extending between the first end and the second end; and a first inlet and a second outlet disposed in the first end and a first outlet and a second inlet disposed in the second end, the first inlet and first outlet defining a first flow path and the second inlet and second outlet defining a second flow path;
a seal element that seals against the end faces of the said plurality of elongate flow paths, the seal element defining the first flow path on one side thereof and the second flow path on the other side thereof, and comprising a plurality of resilient rollers arranged to rotate against the end faces of the plurality of flow paths as they rotate; and
a drive configured to rotate the cylindrical structure; wherein
rotation of the cylindrical structure moves the elongate flow paths from the first flow path to the second flow path.

2. A heat exchanger according to claim 1 wherein said length is at least twice said diameter.

3. A heat exchanger according to claim 1 wherein said elongate flow paths are hexagonal.

4. A heat exchanger according to claim 1 wherein said plurality of elongate flow paths comprises at least one of: a plastics extrusion containing a plurality of parallel flow paths; and/or a plurality of elongate straw like elements arranged adjacent one another.

5. A heat exchanger according to claim 1 wherein said second flow path comprises a cooled air flow path and said first flow path comprises a heated air flow path, and wherein the said second flow path comprises a greater number of said plurality of elongate flow paths than the said first flow path.

6. A heat exchanger according to claim 1 wherein said seal element comprises two seals extending substantially from a center of rotation of the cylindrical element to the edge of the cylindrical element.

7. A heat exchanger comprising:
an elongate heat exchange element comprising: a substantially cylindrical structure having a first end and a second end and wherein the length is greater than the diameter; and a plurality of elongate flow paths extending between the first end and the second end; and a first inlet and a second outlet disposed in the first end and a first outlet and a second inlet disposed in the second end, the first inlet and first outlet defining a first flow path and the second inlet and second outlet defining a second flow path;
a seal element that seals against the end faces of the said plurality of elongate flow paths, the seal element defining the first flow path on one side thereof and the second flow path on the other side thereof, and comprising a resilient core supporting a compliant low friction fabric rubbing surface; and
a drive configured to rotate the cylindrical structure; wherein rotation of the cylindrical structure moves the elongate flow paths from the first flow path to the second flow path.

8. A heat exchanger according to claim 1 further comprising an inlet fan in fluid communication with the first flow path and an outlet fan in fluid communication with the second flow path, said inlet and outlet fans for driving gas through the first flow path in a first direction and through the second flow path in the opposite direction to effect that transfer between the fluid flowing in the first and second flow paths.

9. A heat exchanger according to claim 8 wherein said inlet and outlet fans are located at or adjacent the second end of the cylindrical structure.

10. A heat exchanger according to claim 8 wherein said inlet and outlet fans are located at opposite ends of the cylindrical structure.

11. A heat exchanger according to claim 8 wherein said inlet and outlet fans are located at a common end of the cylindrical structure and are driven by a single motor.

12. A heat exchanger comprising:
an elongate heat exchange element comprising: a substantially cylindrical structure having a first end and a second end and wherein the length is greater than the diameter; and a plurality of elongate flow paths extending between the first end and the second end; and a first inlet and a second outlet disposed in the first end and a first outlet and a second inlet disposed in the second end, the first inlet and first outlet defining a first flow path and the second inlet and second outlet defining a second flow path;
a seal element that seals against the end faces of the said plurality of elongate flow paths, the seal element defining the first flow path on one side thereof and the second flow path on the other side thereof, wherein the seal element is surrounded by a seal housing and wherein the seal housing at the second end of the cylindrical structure further comprises a seal bypass within the housing so that, immediately adjacent the seal, a flow path is provided from outlets of the elongate flow paths of the first flow path to the inlets of the elongate flow paths of the second flow path; and
a drive configured to rotate the cylindrical structure; wherein rotation of the cylindrical structure moves the elongate flow paths from the first flow path to the second flow path.

13. A heat exchanger according to claim 12 further comprising an inlet fan in fluid communication with the first flow path and an outlet fan in fluid communication with the second flow path, said inlet and outlet fans for driving gas through the first flow path in a first direction and a through the second flow path in the opposite direction to effect that transfer between the fluid flowing in the first and second flow paths and wherein said inlet and outlet fans are located at or adjacent the first end of the cylindrical structure.

14. A heat exchanger according to claim 1 wherein said cylindrical structure is mounted within a bearing at either end, and the means for rotating the cylindrical structure comprises a drive means configured to apply a force to the exterior of the cylinder so as to rotate it within the bearings.

15. A heat exchanger according to claim 7 wherein said second flow path comprises a cooled air flow path and said first flow path comprises a heated air flow path, and wherein the said second flow path comprises a greater number of said plurality of elongate flow paths than the said first flow path.

16. A heat exchanger according to claim 7 further comprising an inlet fan in fluid communication with the first flow path and an outlet fan in fluid communication with the second flow path, said inlet and outlet fans for driving gas through the first flow path in a first direction and through the second flow path in the opposite direction to effect that transfer between the fluid flowing in the first and second flow paths.

17. A heat exchanger according to claim 12 wherein said second flow path comprises a cooled air flow path and said first flow path comprises a heated air flow path, and wherein the said second flow path comprises a greater number of said plurality of elongate flow paths than the said first flow path.

18. A heat exchanger according to claim 12 further comprising an inlet fan in fluid communication with the first flow path and an outlet fan in fluid communication with the second flow path, said inlet and outlet fans for driving gas through the first flow path in a first direction and through the second flow path in the opposite direction to effect that transfer between the fluid flowing in the first and second flow paths.

* * * * *